UNITED STATES PATENT OFFICE.

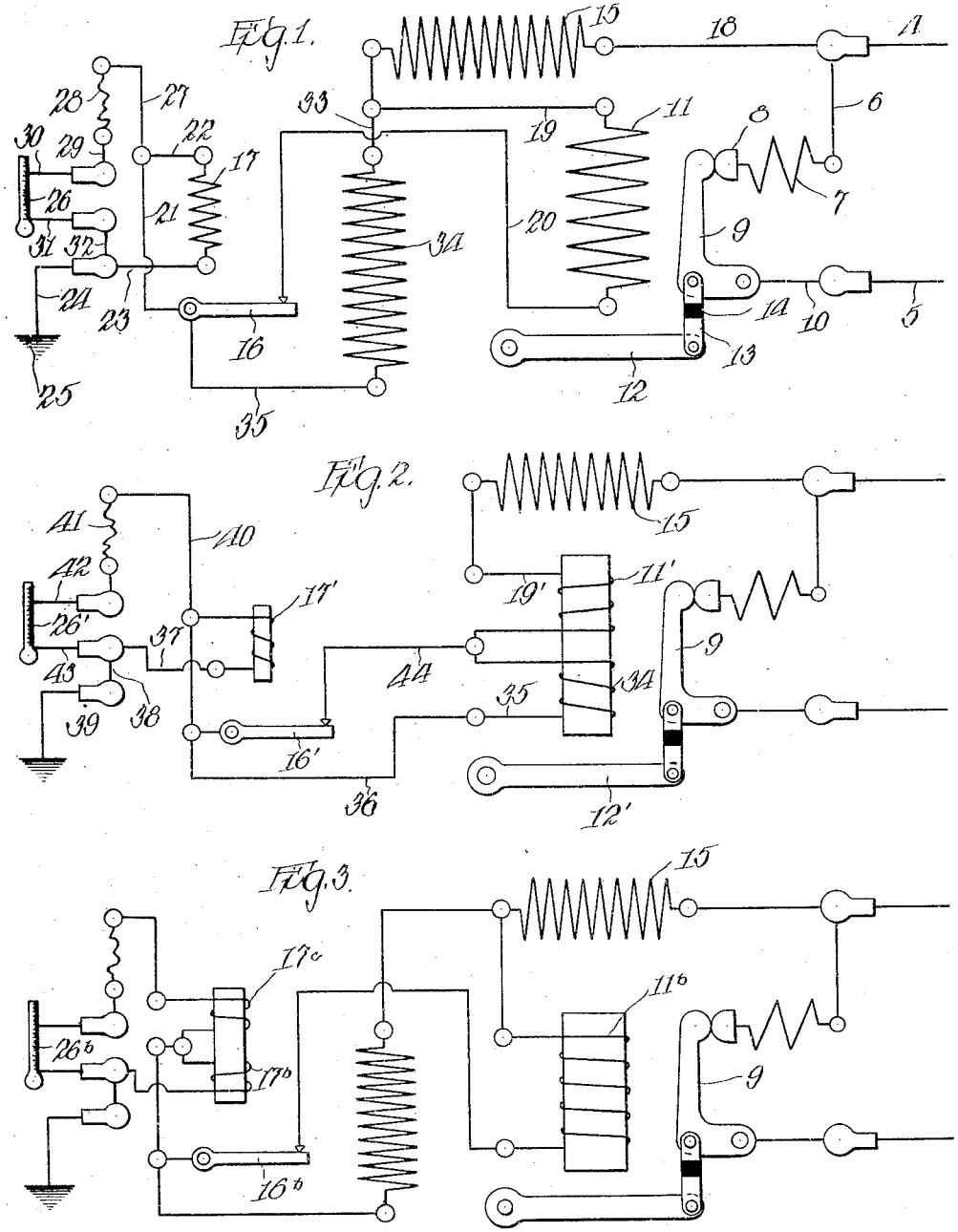

DAVID E. GRAY, OF CHICAGO, ILLINOIS, ASSIGNOR TO RAILWAY UTILITY COMPANY, OF CHICAGO, ILLINOIS, A CORPORATION OF ILLINOIS.

ELECTRIC HEATING SYSTEM.

1,363,776.        Specification of Letters Patent.        Patented Dec. 28, 1920.

Application filed July 3, 1916. Serial No. 107,435.

*To all whom it may concern:*

Be it known that I, DAVID E. GRAY, a citizen of the United States, residing at Chicago, Cook county, Illinois, have invented certain new and useful Improvements in Electric Heating Systems, of which the following is a specification.

The heating systems to which my invention relates are more particularly used in connection with electrically driven railroad cars, trams and the like which it is desired or required by law shall be kept within certain temperature limits. For this purpose it is known to control the circuit of the electric heaters by a contactor which in turn is controlled by electro-magnetic means, the energization of which is regulated by a thermostat within the car. The object of my invention is to provide a system of this character which shall be accurate in its regulation of the temperature of the car, simple in construction and not liable to get out of operative condition.

In the accompanying drawing I have diagrammatically shown three preferred forms of my invention and have described them in detail hereinafter. It is to be understood, however, that the specific disclosure is for the purpose of exemplification only and that the scope of the invention is defined in the following claim in which I have endeavored to distinguish it from the prior art so far as known to me without, however, relinquishing or abandoning any portion or feature thereof. In the drawing the invention is illustrated diagrammatically only, the pieces of apparatus employed being *per se* old and well known so that no specific illustration is necessary. Figures 1, 2 and 3 each show diagrammatically a system embodying my invention, the specific differences between them being pointed out hereinafter.

Referring first to the system shown in diagram in Fig. 1, the connections to the single source of electrical energy employed are shown at 4, 5, it being understood that any suitable electric heating device may be inserted between either of these leads and the source of energy. Any suitable form of contactor for opening and closing the described heating circuit may be employed and I have diagrammatically shown such a device, the coil thereof being indicated at 11, the movable contact at 9, the stationary contact at 8, a blow-out coil 7, and an armature 12 controlled by the coil 11 and connected to movable contact 9 by an intermediately insulated link 13, 14. The contacts are connected to the leads 4 and 5, respectively, by wires 6, 10. The coil 11 of the contactor is controlled as to its energization by a relay comprising a coil 17 and an armature 16, the latter adapted to open and close the circuit of the coil 11, and the energization of coil 17 of the relay is controlled by a thermostat 26 in such wise that when the temperature rises closing the circuit through the thermostat the relay is deënergized, opening the circuit through the coil 11 which thereupon releases its armature, permitting the contactor to open and break the heating circuit, and when the temperature again falls, opening the circuit through the thermostat, the relay is again energized, closing the circuit through the coil 11 of the contactor and thereby closing the heating circuit.

Between the system for controlling the contactor and lead 4 is interposed a high resistance 15 for the purpose of reducing the current through the control system, said coil being connected to the lead 4 by wire 18. Coil 11 is connected to the terminal of resistance 15 by wires 19 and 15$^a$ and its connection to ground from its other terminal includes wire 20 and the switch 16 of the relay. When said switch is open the coil 11 is, of course, deënergized and when closed, it is energized. Coil 17 of the relay and thermostat 26 are supplied with current when switch 16 is open, through a high resistance shunt about coil 11 and said switch, including wire 33, resistance coil 34, and wire 35. From said switch and wire 35 which are united electrically, current is supplied to the coil 17 of the relay and thermostat 26 through wire 21, said coil and thermostat being in shunt or parallel to each other, so that when the circuit is closed through the thermostat, coil 17 is substantially deënergized, but when the circuit through the thermostat is open, coil 17 is energized. From wire 21 the path of the current through coil 17 comprises wire 22, said coil, wire 23 and wire 24 to ground at 25, and the shunt through the thermostat comprises wire 27, wire 28, wire 29, wire 30, said thermostat 26, wire 32 and wire 24, to ground.

It will now be seen that there is at all times a feeble current passing through the coil 17 of the relay, either through resistance 34 or both by way of said resistance and coil 11 and relay switch 16 when the latter is closed. When the circuit through the thermostat is broken the entire current flowing will pass through the coil 17. When, however, the circuit is closed through the thermostat, the latter being in shunt to the coil 17, but a small part of the current passes through coil 17 by reason of its high resistance as compared with that of the circuit including the thermostat and, therefore, when the temperature is sufficiently high to close the path through the thermostat coil 17 is insufficiently energized to retain its armature and the armature drops. The dropping of the armature 16 opens the circuit through coil 11 which permits the opening of the contactor.

Turning now to the forms of the invention shown in Figs. 2 and 3, it will be seen that the heating circuit is the same in both the systems there shown as in Fig. 1 and in each the same resistance 15 is employed. Instead of the simple coil 11, however, the modification of the system shown in Fig. 2 employs an electro-magnet having reversed coils, one of which is in shunt to the contact 16'. The relay coil 17' and the means for controlling the circuit thereof are or may be substantially the same as those shown in Fig. 1. In this system there is a closed path for the current through resistance 15, wire 19', coil 11', reversed coil 34, wire 35, wire 36, coil 17', wire 37, wire 38 and wire 39 to ground. With the relay contact 16' open, however, the coils 11' and 34 balance each other so that the armature 12' is unattracted and the contactor 9 open. This condition exists whenever the temperature in the car is above the desired minimum for then the coil 17' is short-circuited through the thermometer-thermostat 26' through the shunt including wire 40, fuse 41, wire 42, the thermostat and wire 43. When, however, the temperature falls sufficiently to break the circuit through the thermostat the coil 17' is energized to close the contact 16'. Under this circumstance the coil 34 is short-circuited through wire 44 and contact 16', whereby, coil 11' being unopposed, the magnet attracts its armature and closes the contactor.

In the construction shown in Fig. 3, the contactor 11$^b$ has a single coil like the form shown in Fig. 1 from which the form of Fig. 3 differs substantially only in the relay which controls the circuit and contactor coil 11. The relay of Fig. 3 has the opposed windings similar to the windings of the contactor of Fig. 2, the lower of which windings 17$^b$ is constantly in circuit and the upper winding 17$^c$ is in series with the thermostat 26$^b$. When the temperature of the car is above the minimum required, the current flows through both of the opposed windings which neutralize each other so that the contact 16$^b$ is open and hence the contactor 9 is likewise open. When, however, the temperature of the car falls so that the circuit through winding 17$^c$ is interrupted at the thermostat the unopposed winding 17$^b$ energizes the magnet to attract the contactor 16$^b$, closing the circuit through the contactor coil 11$^b$ and closing the contactor 9.

In each of the above described systems the coils of the contactor and relay respectively are in series and it will be observed that the current flowing through the regulating circuit is less when the contactor contacts are open than when they are closed.

I claim:

In an electric heating system for cars and the like, a heating circuit connected to the mains and comprising a contactor, a magnet the armature of which is operably connected to the movable element of the contactor, connections from one terminal of the coil of said magnet to one of the mains, connections from the other terminal of said coil to ground, a switch 16 in the last said connection and adapted to open and close the circuit of the magnet coil, a resistance 34 in shunt to said magnet coil and the armature of the switch, the coil of the switch being electrically connected to said switch and said resistance at one terminal and to ground at the other terminal and a thermometer thermostat in shunt to said switch coil and adapted to energize the same.

DAVID E. GRAY.